Figures 1, 2:
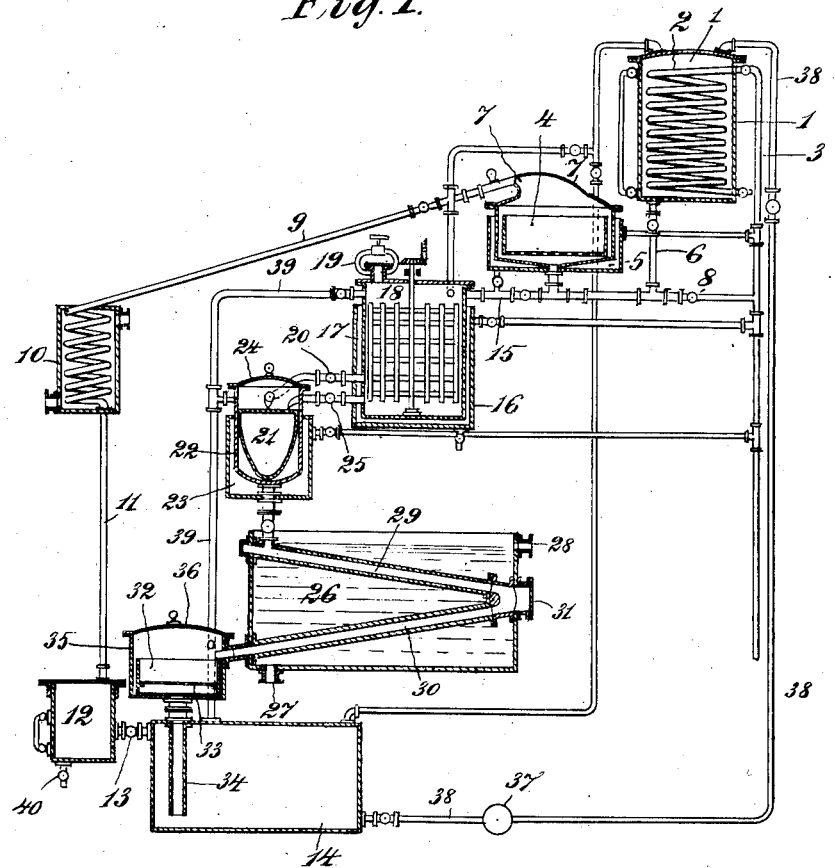

No. 833,114. PATENTED OCT. 9, 1906.
J. J. M. BÉCIGNEUL.
APPARATUS FOR TREATING GAS PURIFYING MATERIALS.
APPLICATION FILED MAY 15, 1906.

UNITED STATES PATENT OFFICE.

JOSEPH JULES MARIE BÉCIGNEUL, OF NANTES, FRANCE.

APPARATUS FOR TREATING GAS-PURIFYING MATERIALS.

No. 833,114.            Specification of Letters Patent.            Patented Oct. 9, 1906.

Original application filed July 19, 1905, Serial No. 270,374. Divided and this application filed May 15, 1906. Serial No. 316,994.

*To all whom it may concern:*

Be it known that I, JOSEPH JULES MARIE BÉCIGNEUL, a citizen of the French Republic, residing in Nantes, Loire Inferieure, France, have invented certain new and useful Improvements in Apparatus for Treating Gas-Purifying Materials, of which the following is a description.

This invention, which is a division of my application filed July 19, 1905, under Serial No. 270,374, relates to an apparatus for carrying out in an economical and effective manner the process described in my said application for treating the spent material used in purifying gas, with the view mainly of extracting and recovering the sulfur contained therein.

In the accompanying drawings, which serve to illustrate an embodiment of the invention, Figure 1 is a general view of the apparatus seen in vertical section, and Fig. 2 is an enlarged cross-section of either of the flattened condensing-pipes 29 or 30.

In order that the present invention may be the better understood, it may be briefly stated that in the process of recovering the sulfur from spent gas-purifying materials the sulfur is dissolved out of the material with the aid of toluene, or, by preference, a mixture of toluene and carbon tetrachlorid, with the aid of heat, the sulfur being afterward precipitated from its solution, and as toluene is a volatile liquid the present apparatus provides for filtering and recovering it, so that it may be used again with very little loss.

The apparatus and its operation will now be described.

1 is a tight heating-reservoir for the liquid solvent. It is heated by a steam-coil 2, supplied by a pipe 3 from any steam-generator.

4 is the receptacle to contain the material to be treated. This receptacle is provided with a steam-jacket 5, supplied with steam from the pipe 3 by a branch pipe, and it receives the heated solvent from the reservoir 1 through a pipe 6, which enters the receptacle 4 at the bottom. The cover 7 of the receptacle 4 is removable. At the required time during the operation, the admission of the solvent being cut off by a cock in the pipe 6, steam is admitted at 8 to the pipe 6 and supplied thence to the receptacle 4. The vaporized solvent from the receptacle mixed with steam passes off through a pipe 9 to a coil in a condenser 10 and thence by a pipe 11 down to a separator 12, where the water separates by gravity, and the toluene is led by a pipe 13 into a reservoir 14.

After digesting the material in receptacle 4 with the solvent until the latter has taken up all of the sulfur the solvent is drawn off by a pipe 15 into a closed receptacle 16, which is heated by a steam-jacket 17. In the receptacle or tank 16 is a rotating agitator 18. This tank 16 is also provided with an inlet 19, at which is introduced animal charcoal or bone-black, which is mixed with the solvent by means of the agitator and absorbs the tars carried in by the solvent. This clear liquid when freed from the tars is drawn off by a pipe 20 into a filter 21, inclosed in a vessel 22, heated by a steam-jacket 23. The vessel 22 is provided with a cover 24, removable for charging the filter. The muddy liquid is drawn off from 16 through a lower pipe provided with a valve 25. After passing through the filter 21 the filtered liquid flows through an outlet-pipe at the bottom of the filter into a precipitating device below the filter. This device consists of a tank 26, through which cold water flows upward from an inlet 27 to an outlet 28. Immersed in the water is a V-shaped conduit composed of two flattened pipes 29 and 30, (see also Fig. 2,) connected at their junction by a holder 31. The hot solvent charged with sulfur enters the higher end of the pipe 29, and in flowing down through the conduit the sulfur is precipitated, but carried along with the liquid, and finally is carried by and with the latter into a closed strainer or basket 32, provided with a bottom 33 of fine wire-gauze. This gauze arrests the sulfur; but the liquid solvent flows down through and is discharged through a pipe 34 into the reservoir 14. The basket 32 is inclosed in a closed vessel or receptacle 35, provided with a removable cover 36. The liquid solvent collected in the reservoir 14 is pumped up by a pump 37 to the upper holder 1 through a pipe 38.

Suitable pipes 39 connect the respective containers of the apparatus and equalize the pressure therein. The separator 12 is furnished with a cock-controlled outlet 40 to draw off the sludge that accumulates in the bottom of the same. The header 31 enables one to get access to the pipes 29 and 30 for inspection and cleaning.

The construction described permits of recovering practically all of the volatile solvent in pure state, so that it may be employed continuously.

Obviously suitable cocks will be provided in the various pipes where needed, and obviously some variation in the construction and arrangement of the parts is admissible without departing materially from the invention.

Having thus described my invention, I claim—

1. In an apparatus for extracting sulfur from spent gas-purifying material, a receptacle to contain the material treated, said receptacle having a removable cover, an inlet at the bottom for hot liquid solvent and steam, and an outlet at the top for vapors, a mixer to purify the solvent, provided with an agitator, a pipe connecting said receptacle with the mixer, a filter, pipes at different levels connecting the mixer with said filter, a precipitating device, comprising a water-tank and a conduit therein composed of flattened and inclined pipes immersed in the water, said conduit being connected at its upper, receiving end with the bottom of the filter, a strainer, with which the lower discharging end of the said conduit connects, a reservoir for the solvent, a pipe connecting the bottom of the strainer with said reservoir, a vapor-condenser, a pipe connecting the vapor-outlet of the receptacle for the materials with said condenser, a separator, a pipe connecting the condenser with said separator, and a pipe connecting the separator with said solvent-reservoir.

2. In an apparatus for extracting sulfur from spent gas-purifying material, a heating-reservoir 1 for the liquid solvent, a close receptacle 4 for the material to be treated, said receptacle being below the level of the reservoir 1 and provided at its bottom with an inlet for the solvent and for steam and a removable cover with an outlet for vapors, means for admitting solvent and steam to said receptacle, a jacket 5 for said receptacle 4, a close mixing-vessel 16 below the level of the receptacle 4, and provided with an agitator, and steam-jacket, a filter 21 below the level of the mixer and provided with a steam-jacket, pipes at different levels for drawing the contents of the mixer into the filter, a vessel 22 inclosing the filter, a precipitating device below the filter and comprising a water-tank 26 having means for continuously supplying water thereto, and a V-shaped conduit composed of the pipes 29, and 30, said conduit being connected at its upper end with the filter, a strainer 32, connected with the lower end of said conduit, a reservoir 14 below the level of the strainer, a pipe 34 connecting the latter with the reservoir 14, a pipe 38 connecting the reservoirs 14 and 1, a pump 37 for forcing the liquid through 38 from the lower to the higher reservoir, a condenser 10, a pipe 9 connecting the vapor-outlet of 4 with the condenser, a separator 12, below the condenser and provided with a sludge-outlet 40, a pipe 11 connecting the condenser with the separator, a pipe connecting the separator with the reservoir 14, steam-pipes to supply steam, and pressure-equalizing pipes connecting the closed containers.

In witness whereof I have hereunto signed my name, this 17th day of April, 1906, in the presence of two subscribing witnesses.

JOSEPH JULES MARIE BÉCIGNEUL.

Witnesses:
HIPPOLYTE BÉCIGNEUL,
IVES LE MEIGNEN.